US010462064B2

(12) United States Patent
Raj et al.

(10) Patent No.: US 10,462,064 B2
(45) Date of Patent: Oct. 29, 2019

(54) MAXIMUM TRANSMISSION UNIT INSTALLATION FOR NETWORK TRAFFIC ALONG A DATAPATH IN A SOFTWARE DEFINED NETWORK

(71) Applicant: HEWLETT PACKARD ENTERPRISE DEVELOPMENT LP, Houston, TX (US)

(72) Inventors: Anil Raj, Bangalore (IN); Celestian K. Sebastian, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/513,204

(22) PCT Filed: Nov. 5, 2014

(86) PCT No.: PCT/US2014/064058
§ 371 (c)(1),
(2) Date: Mar. 22, 2017

(87) PCT Pub. No.: WO2016/048389
PCT Pub. Date: Mar. 31, 2016

(65) Prior Publication Data
US 2017/0302584 A1 Oct. 19, 2017

(30) Foreign Application Priority Data
Sep. 26, 2014 (IN) ............................ 4727/CHE/2014

(51) Int. Cl.
*H04L 12/805* (2013.01)
*H04L 12/64* (2006.01)

(52) U.S. Cl.
CPC .......... *H04L 47/36* (2013.01); *H04L 12/6418* (2013.01); *H04L 2012/6443* (2013.01)

(58) Field of Classification Search
CPC ...................................................... H04L 47/36
See application file for complete search history.

(56) References Cited

U.S. PATENT DOCUMENTS 4,827,411 A * 5/1989 Arrowood ............... H04L 29/00
7,596,151 B2 * 9/2009 Kim ........................ H04L 47/36
370/235

(Continued)

FOREIGN PATENT DOCUMENTS

| CN | 103532672 A | 1/2014 |
|---|---|---|
| WO | WO-2014050091 A1 | 4/2014 |
| WO | WO-2014057375 A2 | 4/2014 |

OTHER PUBLICATIONS

Aaron Rosen, "Network Service Delivery and Throughput Optimization via Software Defined Networking," Jan. 1, 2012, pp. 1-65, Thesis, Clemson University, Tiger Prints.

(Continued)

*Primary Examiner* — Farley Abad
(74) *Attorney, Agent, or Firm* — Hewlett Packard Enterprise Patent Department

(57) ABSTRACT

In some examples, a maximum transmission unit (MTU) is installed by a Software-Defined Network (SDN) controller on a controlled network node for traffic along a datapath in an SDN. The installed MTU can, for example, be selected from MTU sizes in an MTU database for nodes along the datapath. For example, the installed MTU can be selected as the largest allowable MTU size based on the nodes of the datapath.

14 Claims, 7 Drawing Sheets

(56) References Cited

U.S. PATENT DOCUMENTS

| | | |
|---|---|---|
| 7,920,481 B2 | 4/2011 | Winter et al. |
| 8,451,754 B2 | 5/2013 | Qian et al. |
| 9,042,234 B1 * | 5/2015 | Liljenstolpe ............ H04L 45/00 370/238 |
| 2003/0076850 A1 | 4/2003 | Jason, Jr. |
| 2004/0071140 A1 | 4/2004 | Jason et al. |
| 2007/0115963 A1 | 5/2007 | Vadlakonda et al. |
| 2007/0171828 A1 | 7/2007 | Dalal et al. |
| 2013/0058335 A1 | 3/2013 | Kopenen et al. |
| 2014/0269277 A1 | 9/2014 | Decusatis et al. |
| 2015/0113132 A1 * | 4/2015 | Srinivas .............. H04L 41/0816 709/224 |
| 2015/0117451 A1 * | 4/2015 | Kaneriya .............. H04L 45/745 370/392 |

OTHER PUBLICATIONS

Andre Kotlowski and Achim Brakemeier, "High Data Rate VHF/UHF File Transfer by a Software Defined Multi-Band Radio," Jun. 2003, pp. 185-189, IEEE.

International Search Report and Written Opinion, International Application No. PCT/US2014/064058, dated May 18, 2015, pp. 1-9, KIPO.

* cited by examiner

US 10,462,064 B2

MAXIMUM TRANSMISSION UNIT INSTALLATION FOR NETWORK TRAFFIC ALONG A DATAPATH IN A SOFTWARE DEFINED NETWORK

BACKGROUND

Computer networks can be used to allow networked devices, such as personal computers, servers, and data storage devices to exchange data. Computer networks often include intermediary datapath devices such as network switches, gateways, and routers, to flow traffic along selected data routing paths between networked devices. A data routing path can, for example, be selected by a network controller, administrator, or another entity, and can, for example, be based on network conditions, network equipment capabilities, or other factors.

DETAILED DESCRIPTION

Figure 1:
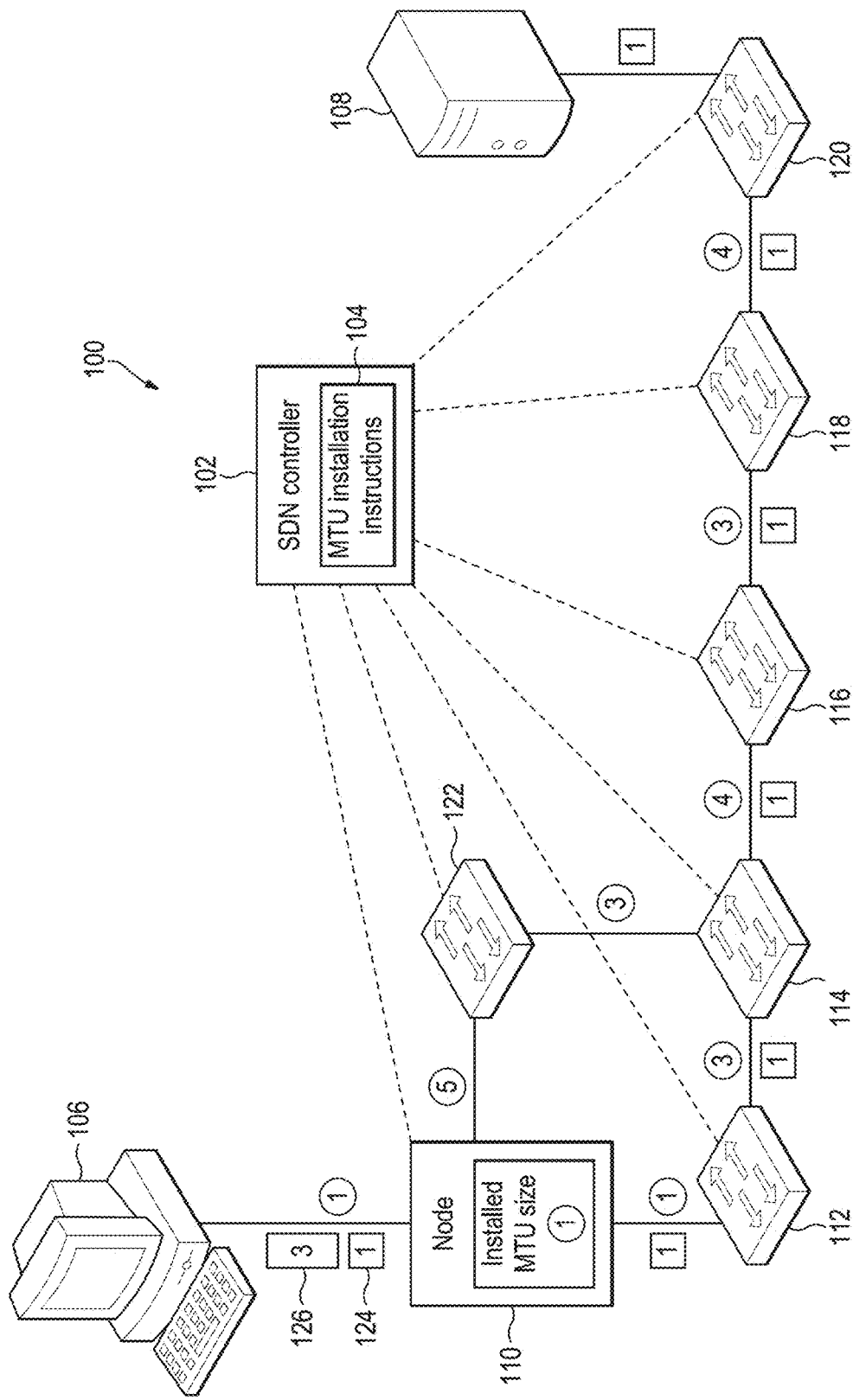
FIG. 1 is a diagram of a software-defined network with traffic along a first datapath, according to an example.

A network node along a network datapath can be programmed with instructions for handling packets that are larger than a maximum transmission unit (MTU) size for an outgoing link. For example, packets can be flagged by their source to indicate whether packet fragmentation is permitted or not permitted. When fragmentation is permitted and the packet is larger than an MTU size for an outgoing link, the node can be instructed to break the packet into smaller packets, so that each packet can pass through the link. When fragmentation is not permitted and the packet is larger than the MTU size for the outgoing link, the node can be instructed to drop the packet and send an error message to the source of the packet.

In situations where fragmentation is permitted, a packet may be fragmented several times along a datapath. For example, a packet having a representative transmission size of (4) may be fragmented by a first network switch along the datapath for a link with an MTU size of (3), resulting in two packets (i.e., one packet with a representative transmission size of (3) and another packet with a representative transmission size of (1)). The larger packet may then be fragmented by a second network switch along the datapath for a link with an MTU size of (2), resulting in three packets (i.e., two packets with a representative transmission size of (1) and another packet with a representative transmission size of (2)). Such repeated fragmentation can result in undue load on each node and can lead to decreased network efficiencies due to increased header size for each fragmented packet.

In situations where fragmentation is not permitted, Path Maximum Transmission Unit (MTU) Discovery (PMTU-D) can be performed using nodes along a datapath to determine a maximum MTU size for the datapath. For example, a packet having a representative transmission size of (4) may be dropped by a first network switch along the datapath for a link with an MTU size of (3). An error message can then be sent by the first network switch to the packet source and the packet source can re-transmit the data with a reduced MTU size of (3). This reduced sized packet can now pass through the first network switch. However, this packet may later be dropped by a second network switch along the datapath for a link with an MTU size of (2). An error message can then be sent by the second network switch to the packet source and the packet source can re-transmit the data with a reduced MTU size of (2). This reduced sized packet can now be forwarded by both the first and second network switch. This PMTU-D process can result in excessive network traffic and undue load on the processor of the switches along the data path. Moreover, certain security devices can block the error messages sent by network switches, thereby hindering the PMTU-D process.

Certain implementations of the present disclosure seek to address the above issues by leveraging an SDN controller's knowledge of node capabilities within an SDN. For example, as described in further detail with reference to FIGS. 1-9, an SDN controller can be programmed to determine the MTU size for each link along a datapath in the SDN, select one of the determined MTU sizes as the largest allowable MTU size for the datapath, and install, on a controlled node along the datapath, the largest allowable MTU size as the MTU size for traffic along the datapath.

In situations where fragmentation is not permitted, certain implementations of the present disclosure can be used to reduce network traffic by reducing the number of dropped packets that need to be retransmitted by the packet source. In addition, certain implementations of the present disclosure can be used to avoid delays in setting up a connection due to repeated round-trip times to estimate the PMTU. Certain implementations of the present disclosure can also be used to reduce the chance of denial-of-service attacks based on a malicious party sending large packets to an internet host, as the PMTU-D packet will be handled by fewer nodes along the datapath. Moreover, certain implementations of the present disclosure can be used to avoid black hole connection caused by security devices that block the ICMP messages. In situations where fragmentation is permitted, certain implementations of the present disclosure can provide for fewer instances of packet fragmentation, which can result in reduced header sizes for fragmented packets and reduced load on the network. Moreover, certain implementations of the present disclosure can be used to allow an SDN controller to assign a specific node as a fragmentation node based on relative hardware capabilities of nodes along the datapath. Other advantages of the solutions presented herein will be apparent upon review of the description and figures.

Figure 2:
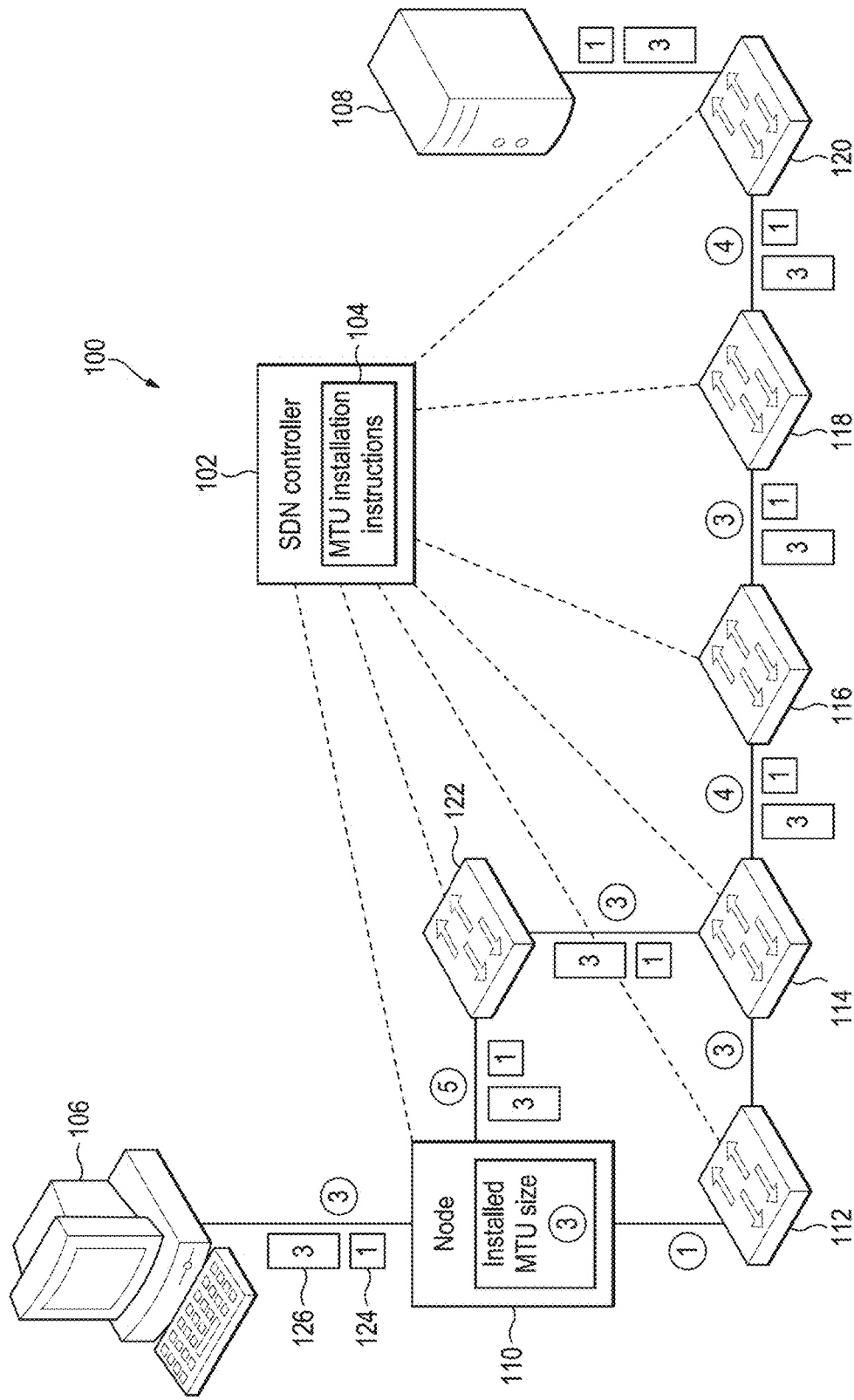
FIG. 2 is a diagram of the software-defined network of FIG. 1 with traffic along a second datapath, according to an example.

FIGS. 1 and 2 are diagrams of an example software-defined network (SDN) 100 including an SDN controller 102 running MTU installation instructions 104. In particular, FIG. 1 depicts traffic along a first example datapath between a source node 106 and a destination node 108, the first datapath being defined by network nodes 110, 112, 114, 116, 118, and 120, and FIG. 2 depicts traffic along a second example datapath between source node 106 and destination node 108, the second datapath being defined by network nodes 110, 122, 114, 116, 118, and 120. Although a single link between each node is illustrated, it is appreciated that each single link may include multiple wires or data channels.

In SDN 100, control decisions for routing traffic through the network is decoupled from the network's physical infrastructure. For example, SDN controller 102 can be used to instruct network nodes to flow traffic along a selected routing path defined by the nodes. In some implementations, these nodes can, for example, be in the form of network switches or other intermediary network devices. The use of such software-defined networking can provide other functionality. For example, SDN applications can be installed on or interface with SDN controller 102 to meet customer use cases, such as to achieve a desired throughput or other quality of service.

Source node 106 and destination node 108 can, for example, be in the form of network hosts or other types of network nodes. For example, source node 106 and destination node 108 can be in the form of suitable servers, desktop computers, laptops, printers, etc. As but one example, source node 106 can be in the form of a desktop computer including a monitor for presenting information to an operator and a keyboard and mouse for receiving input from an operator, and destination node 108 can be in the form of a standalone storage server appliance. It is appreciated that source node 106 and destination node 108 can be endpoint nodes on SDN 100, intermediate nodes between endpoint nodes, or other types of network nodes.

Nodes 110, 112, 114, 116, 118, 120, and 122 can, for example, be in the form of switches or other multi-port network bridges that process and forward data at the data link layer. In some implementations, one or more of the nodes can be in the form of multilayer switches that operate at multiple layers of the OSI model (e.g., the data link and network layers). Although the term "switch" is used throughout this description, it is appreciated that this term can refer broadly to other suitable network data forwarding devices. For example, a general purpose computer can include suitable hardware and machine-readable instructions that allow the computer to function as a network switch. It is appreciated that the term "switch" can include other network data path elements in the form of suitable routers, gateways and other devices that provide switch-like functionality for SDN 100.

Each node within SDN 100 can, for example, help manage the flow of data across a network by only transmitting a received message to a destination device for which the message was intended (or to an intermediary device en route to the destination device). In some implementations, these nodes can rely on flow entries in flow tables stored on a machine-readable medium within each switch (or otherwise accessible by each switch). Each flow entry in a flow table can, for example, contain information such as: (1) match fields to match against packets (e.g., an ingress port and specific packet header fields), (2) a priority value for the flow entry to allow prioritization over other flow entries, (3) counters that are updated when packets are matched, (4) instructions to modify the action set or pipeline processing, and (5) timeouts indicating a maximum amount of time or idle time before a flow is expired by the switch, and (6) a cookie value which can be used by the SDN controller to filter flow statistics, flow modification, and flow deletion.

SDN controller 102 is connected to network nodes via various wired or wireless data links. For illustration, FIGS. 1 and 2 depict SDN controller 102 as being connected to various network nodes via broken lines, however it is appreciated that SDN controller 102 may be directly connected to only one or a few network nodes, while being indirectly connected to other nodes of SDN 100. As but one example, SDN controller 102 can be directly connected to node 110 via a data cable, while being indirectly connected to node 122 (e.g., by relying on node 110 as an intermediary for communication with node 122).

SDN 100 can, for example, be implemented through the use of an SDN controller 102 that interfaces with various SDN-compatible devices via a suitable Application Program Interface ("API"), or another suitable protocol (e.g., Open-Flow and/or simple network management protocol (SNMP)). In some implementations, SDN controller 102 may interface with controlled network devices via an interface channel that connects each controlled device to SDN controller 102 to allow SDN controller 102 to configure and manage each device, receive events from each device, and send packets using each device.

As used herein, the term "controlled" in the context of SDN-compatible network nodes, such as "controlled switches," is intended to include devices within the control domain of SDN controller 102 or otherwise controllable by SDN controller 102. Such a controlled node can, for example, communicate with SDN controller 102 and SDN controller 102 is able to manage the node in accordance with an SDN protocol, such as the OpenFlow protocol. For example, an OpenFlow-compatible switch controlled by SDN controller 102 can permit SDN controller 102 to add, update, and delete flow entries in flow tables of the switch using suitable SDN commands.

In the example SDN 100 depicted in FIGS. 1 and 2, the various network nodes are in the form of intermediary nodes (controlled network switches 110, 112, 114, 116, 118, 120, and 122) and host devices (source node 106 and destination node 108). It is appreciated however, that the implementations described herein can be used or adapted for networks including more or fewer devices, different types of devices, and different network arrangements. It is further appreciated that the disclosure herein can apply to suitable SDNs (e.g., certain hybrid or heterogeneous SDNs) in which some devices are controlled by an SDN controller and some devices are not controlled by the SDN controller. For example, in some implementations, at least one node along a given data path is controlled by SDN controller 102 and at least one node along the given data path is not controlled by SDN controller 102.

The functionality of SDN controller 102 can, for example, be implemented in part using a software program on a standalone machine, such as a server. In some implementations, SDN controller 102 can be implemented on multipurpose machines, such as a suitable desktop computer, laptop, tablet, or the like. In some implementations, SDN controller 102 can be implemented on a suitable non-host network node, such as certain types of network switches. It is appreciated that the functionality of SDN controller 102 may be split among multiple controllers or other devices. For example, SDN 100 is described and illustrated as including only one SDN controller 102. However, it is appreciated that the disclosure herein can be implemented in SDNs with multiple controllers. For example, in some SDNs, network devices are in communication with multiple controllers such that control of the network can be smoothly handed over from a first controller to a second controller if a first controller fails or is otherwise out of operation. As another example, multiple controllers can work together to concurrently control an SDN. In such SDNs, a first controller can, for example, control certain network devices while a second controller can control other network devices. In view of the above, reference in this application to a single SDN controller 102 that controls the operation of SDN 100 is intended to include such multiple controller configurations (and other suitable multiple controller configurations).

As described further below with respect to FIGS. 5 and 6 and their related methods, SDN controller 102 includes machine-readable MTU installation instructions 104, which can, for example, be used to install an allowable MTU size on a first controlled node (e.g., node 110) along a datapath between source node 106 and destination node 108. In the example SDN 100 of FIGS. 1 and 2, packet fragmentation is disabled. As a result, the node will drop the packet and return an error when the packet has a larger MTU size than allowed by the node. The error message can, for example, be in the form of an Internet Control Message Protocol (ICMP) message containing the MTU of the link and indicating that the packet is too big. As a result, packets en route to destination node 108 that have an MTU size greater than the allowable MTU size of the node will be turned back to source node 106, whereas packets having an MTU size less than or equal to the allowable MTU size will continue along the datapath towards destination node 108.

For purposes of illustration, example packets in FIGS. 1 and 2 are depicted as being "longer" or "shorter" and labelled with a boxed number corresponding to a representative transmission size (e.g., 1, 2, 3, 4, and 5). As but one example, a representative maximum transmission unit size of (1) can correspond to 68 bytes, a representative maximum transmission unit size of (2) can correspond to 1280 bytes, a representative maximum transmission unit size of (3) can correspond to 1492 bytes, a representative maximum transmission unit size of (4) can correspond to 1500 bytes, and a representative maximum transmission unit size of (5) can correspond to 7981 bytes. The transmission unit size of packets within SDN 100 can, for example, be set by a software application running on source node 106 or other software or firmware running on source node 106.

Links between nodes 110, 112, 114, 116, 118, 120, and 122 are also labelled in FIGS. 1 and 2 with a circled number corresponding to a representative maximum allowable transmission unit size (e.g., 1, 2, 3, 4, and 5) for each link. The maximum allowable transmission unit size of a network link can, for example, be based on adjacent node capabilities and network protocol standards and can, for example, be set by an equipment manufacturer specifications, network administrator, or another entity.

Nodes within SDN 100 can forward traffic along a datapath based on metadata within the traffic. For example, traffic received at the node can be in the form of a packet. For illustration, the term "packet" is used herein, however, it is appreciated that "packet" can refer to any suitable protocol data unit (PDU). The packet can, for example, include payload data as well as metadata in the form of control data. Control data can, for example, provide data to assist the node with reliably delivering the payload data. For example, control data can include network addresses for source node 106 and destination node 108, error detection codes, sequencing information, and packet size of the packet. In contrast, payload data can include data carried on behalf of an application for use by source node 106 or destination node 108. In situations where control data identifies the packet size of the packet, this size value can be used by node to determine whether the size is greater than the allowable MTU size installed on the node. In situations where the control data does not identify the packet size of the packet, the size can be determined by the node in order to determine whether the size is greater than the allowable MTU size installed on the node.

In the example of FIG. 1, an allowable MTU size of (1) is installed on node 110 for the datapath defined by nodes 110, 112, 114, 116, 118, and 120 to destination node 108. Details regarding the determination of an allowable MTU size for a given data path along with details regarding the installation of an allowable MTU size for a given data path on node 110 are provided below with respect to the methods of FIGS. 5 and 6. In the example of FIG. 1, a first packet 124 has a representative MTU size of (1), which is less than or equal to the representative allowable MTU size of (1) installed on node 110. A second packet 126 has a representative MTU size of (3), which is greater than the representative allowable MTU size of (1) installed on node 110. Because fragmentation is not permitted in this example, second packet 126 is rejected by node 110 while first packet 124 continues along the datapath towards destination node 108. In some implementations, second packet 126 is dropped by node 110 and an ICMP error message containing the MTU of the link and indicating that the packet is too big is sent to source node 106. Source node 106 can then, if desired, re-send the payload of second packet 126 using multiple packets. The terms "first packet" and "second packet" are used for illustration and are not intended to connote a specific order, size, or maximum number of packets. For example, the first packet received by node 110 may have a larger transmission unit size than a second packet received by node 110, and a smaller transmission unit size as a third packet received by node 110.

In the example of FIG. 2, an allowable MTU size of (3) is installed on node 110 for the datapath defined by nodes 110, 122, 114, 116, 118, and 120. In the example of FIG. 2, both first packet 124 (MTU size of (1)) and second packet 126 (MTU size of (3)) have an MTU size less than or equal to the allowable MTU size of (3) installed on node 110. As a result, both first packet 124 and second packet 126 can continue along the datapath.

Although only a single node (node 110) of SDN 100 is described above as including an installed MTU size for a datapath, it is appreciated that certain implementations of the disclosure provided herein may be applicable to SDNs in which multiple nodes allow for such functionality. Such an implementation can, for example, be advantageous where a first datapath between source node 106 and destination node 108 has a first controlled network node that is different than a second datapath between source node 106 and destination node 108.

Figure 3:
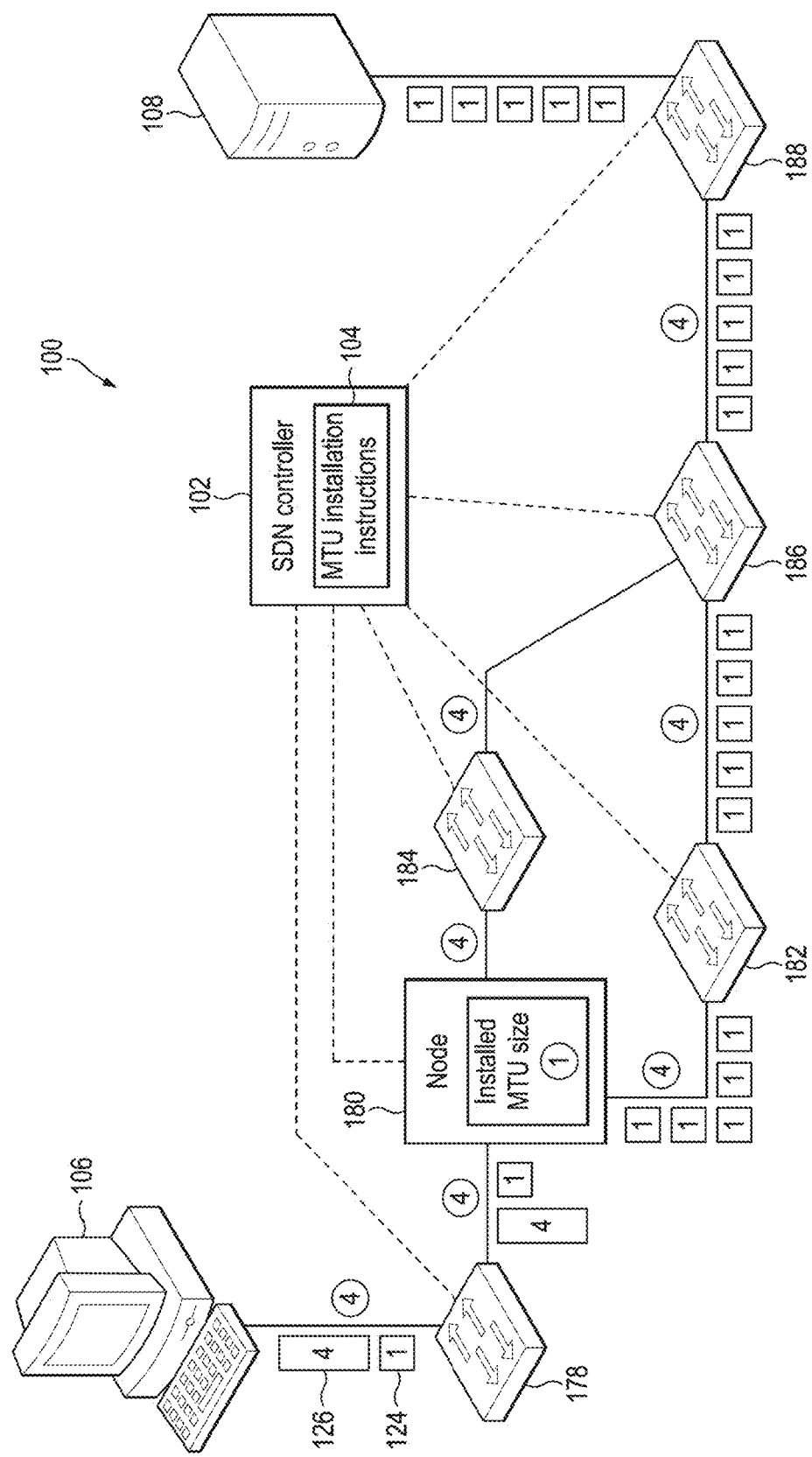
FIG. 3 is a diagram of another software-defined network with traffic along a third datapath, according to an example.
Figure 4:
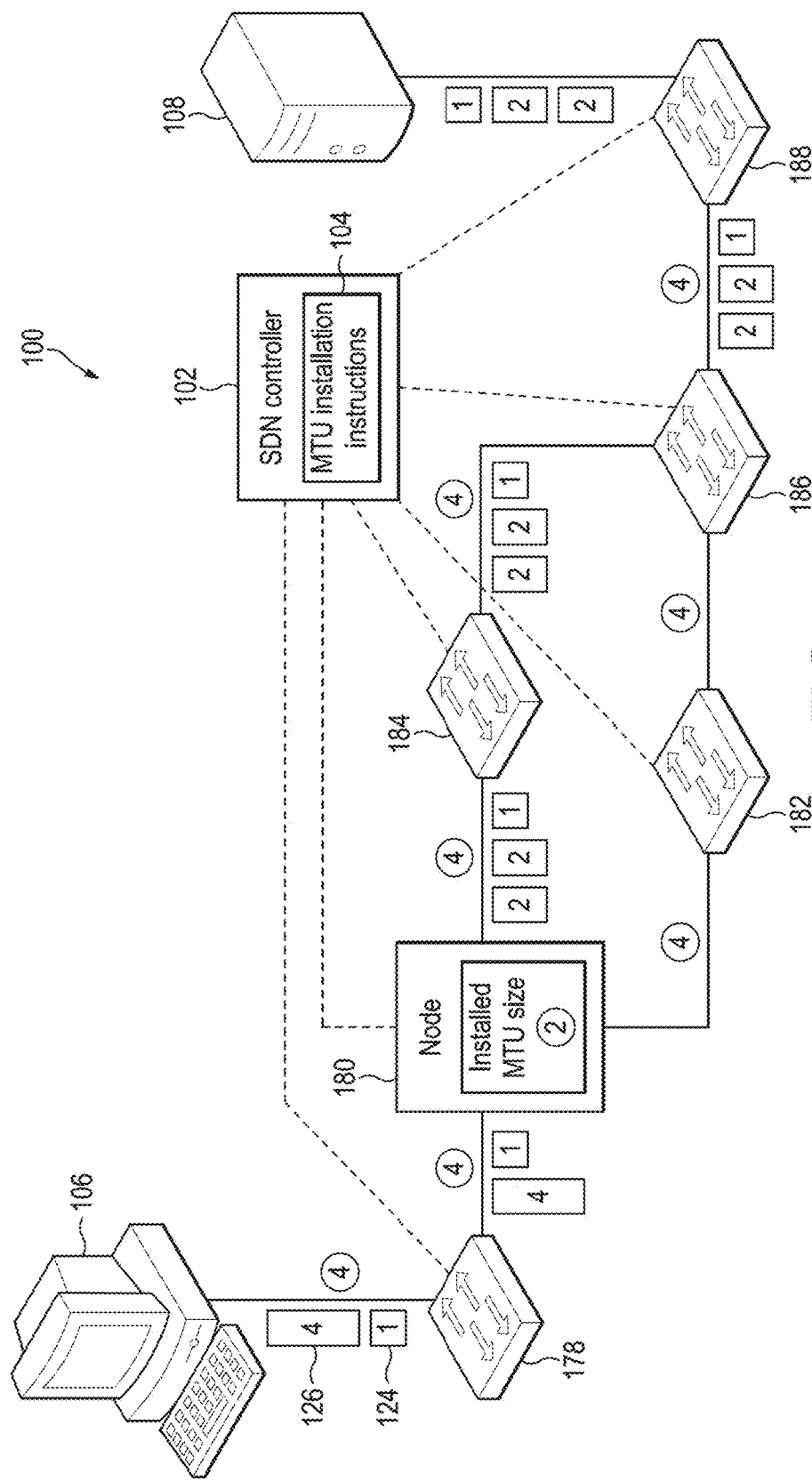
FIG. 4 is a diagram of the software-defined network of FIG. 3 with traffic along a fourth datapath, according to an example.

FIGS. 3 and 4 are diagrams of another example SDN 100 including an SDN controller 102 running MTU installation instructions 104. In particular, FIG. 3 illustrates traffic along a third example datapath defined by network nodes 178, 180, 182, 186, and 188 and FIG. 4 illustrates traffic along a fourth example datapath defined by network nodes 178, 180, 184, 186, and 188. It is appreciated that one or more aspects of SDN 100 and its elements described above with respect to FIGS. 1 and 2 can be applicable to SDN 100 of FIGS. 3 and 4. As but one example, although a single link between nodes is illustrated in FIGS. 3 and 4, it is appreciated that each single link may include multiple wires or data channels.

As described further below with respect to FIGS. 5 and 6 and their related methods, SDN controller 102 includes machine-readable MTU installation instructions 104, which can, for example, be used to install an allowable MTU size on a first controlled node (e.g., node 110) along a datapath between source node 106 and destination node 108. In the example SDN 100 of FIGS. 3 and 4, packet fragmentation is permitted. For example, a packet generated by source node 106 can be flagged to instruct a network node (e.g., a network switch) to fragment the packet if the packet is greater than an MTU size allowed by an outgoing link. As a result, packets en route to destination node 108 that have an MTU size greater than the allowable MTU size will be fragmented into smaller packets and continue along the datapath to destination node 108.

In the example of FIG. 3, an allowable MTU size of (1) is installed on node 180 for the datapath defined by nodes 178, 180, 182, 186, and 188. Details regarding the process of determining an allowable MTU size for a given data path are provided below with respect to the methods of FIGS. 5 and 6. In this example, second packet 126 has a representative MTU size of (4), which is greater than the representative allowable MTU size of (1) installed on node 180. As a result, second packet 126 is fragmented into multiple packets each having a representative MTU size of (1). In the example of FIG. 4, an allowable MTU size of (2) is installed on node 180 for the datapath defined by nodes 178, 182, 184, 186, and 188. In this example, second packet 126 has a representative MTU size of (4), which is greater than the representative allowable MTU size of (2) installed on node 180. As a result, second packet 126 is fragmented into two packets each having a representative MTU size of (2).

Figure 5:
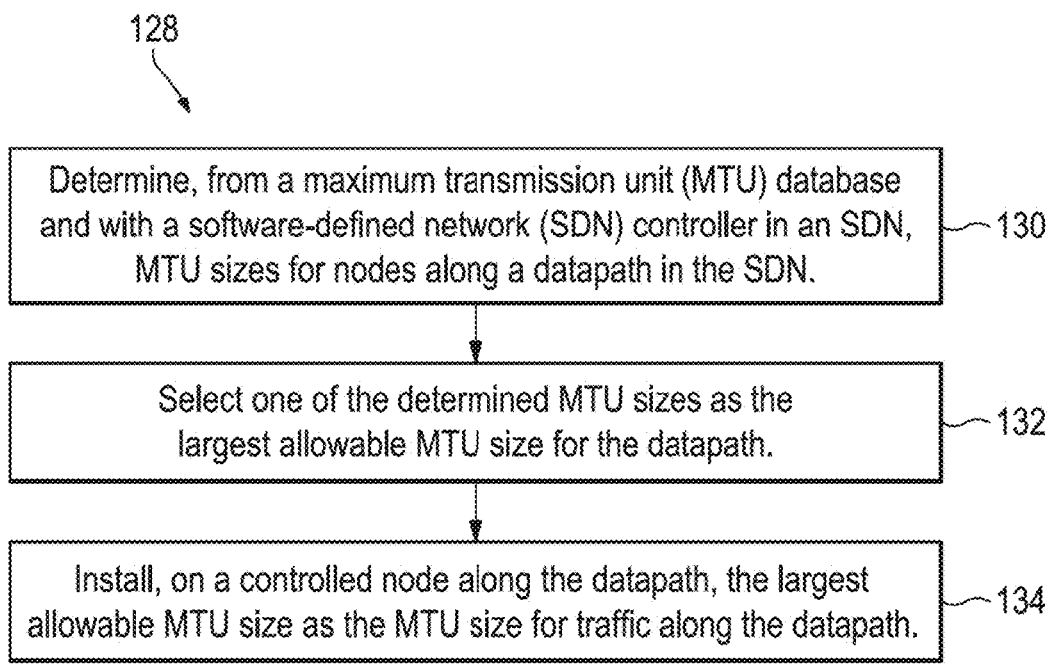
FIG. 5 is a flowchart illustrating a method, according to an example.

FIG. 5 illustrates a flowchart for a method 128 relating to the use of an SDN controller to install an allowable MTU size on a network node for traffic along a datapath. For illustration, the description of method 128 and its component steps make reference to example SDN 100 and elements thereof, such as node 110, source node 106, and destination node 108, however, it is appreciated that method 128 or aspects thereof can be used or otherwise applicable for any suitable network or network element described herein or otherwise. For example, method 128 can be applied to computer networks with different network topologies than those illustrated in FIGS. 1-4.

Method 128 includes a step 130 of determining, from an MTU database and with SDN 100, an MTU size for nodes along a datapath in SDN 100. With reference to the first example datapath of FIG. 1, SDN controller 102 determines, from the MTU database, an MTU size for links to nodes 110, 112, 114, 116, 118, and 120 along a first datapath. With reference to the second example datapath of FIG. 2, SDN controller 102 determines, from the MTU database, an MTU size for links to nodes 110, 122, 114, 116, 118, and 120 along a second datapath. SDN controller 102 can, for example, determine MTU sizes by pulling stored values from the MTU database. As described in further detail below with respect to the method of FIG. 6, the MTU database can be updated when nodes are added to or removed from SDN 100, or otherwise queried by SDN controller 102.

Method 128 includes a step 132 of selecting one of the determined MTU sizes as the largest allowable MTU size for the datapath. In some implementations, the smallest MTU size among the determined MTU sizes is selected as the largest allowable MTU size for traffic along the datapath. Using this selection criteria and with reference to the first example datapath of FIG. 1, the smallest MTU size of all links along the datapath is (1) due to the MTU size of the link from node 110 to node 112. As a result, an MTU size of (1) is selected as the largest allowable MTU size for the first example datapath of FIG. 1. With reference to the second example datapath of FIG. 2, the smallest MTU size of all links along the datapath is (3) due to the MTU size of the link from node 122 to 114 (or from node 116 to 118). As a result, an MTU size of (3) is selected as the largest allowable MTU size for the second example datapath of FIG. 1. It is appreciated that the MTU size of the link from node 110 to node 112 is not considered for purposes of step 132 because the datapath of the example depicted in FIG. 2 does not include node 112.

Method 128 includes a step 134 of installing, on the first controlled node along the datapath (e.g., node 110 in the example datapaths of FIGS. 1 and 2), the largest allowable MTU size as the MTU size for traffic along the datapath. In some implementations, step 134 can include installing, on a first controlled node along a first datapath (node 110 in the first example datapath of FIG. 1), a first largest allowable MTU size as the MTU size for traffic along the first datapath and installing, on a first controlled node along a second datapath (also node 110 on the second example datapath of FIG. 2), a second largest allowable MTU size as the MTU size for traffic along the second datapath. In the example datapaths of FIGS. 1-4, the first node along the first datapath (node 110) is the same node as the first node along the second datapath. However, it is appreciated that for some network topologies, the first node along the first datapath may be a different node from the first node along the second datapath.

SDN controller 102 can select a controlled node for installation of the determined allowable MTU size based on certain criteria. For example, in some implementations, SDN controller 102 installs the determined allowable MTU size on the first controlled node along a datapath (e.g., node 110 in the example of FIGS. 1 and 2) along a datapath. In some implementations, SDN controller 102 installs the determined allowable MTU size on a controlled node other than the first controlled node along a datapath (e.g., node 180 in the example of FIGS. 3 and 4). In some implementations, SDN controller 102 selects a node for installing the determined allowable MTU size based on aspects of the node itself instead of or in addition to the nodes position along a datapath. Such aspects of the node can include, for example, "static" parameters such as CPU, memory, relative location within SDN 100, and/or stack capabilities. For example, with reference to FIGS. 3 and 4, node 180 may have greater processor capabilities than node 178, which is why SDN controller 102 installed the determined MTU size on node 180 rather than node 178 even though node 180 is downstream of node 178 along the datapath. SDN controller 102 can further select a controlled node for installation of the determined allowable MTU size based on certain "dynamic" parameters, such as load on the switch, memory available, etc. For example, in some implementations where packet fragmentation is permitted, an "optimal" switch for installation of the determined allowable MTU size can be based on static and dynamic parameters along the datapath. For example, in some implementations where packet fragmentation is permitted, an "optimal" switch for installation of the determined allowable MTU size can be determined as a switch providing the fewest number of fragmentations between source node 106 and destination node 108. Such a switch can further be selected as the switch that is closest to destination node 108 and providing the fewest number of fragmentations between source node 106 and destination node 108.

As described above, method 128 can apply to certain hybrid or heterogeneous SDNs in which some nodes along a datapath are controlled by SDN controller 102 and some nodes are not controlled by SDN controller 102. For example, in some implementations, at least one node (e.g., node 110) along a given datapath is controlled by SDN controller 102 and at least one node (e.g., node 114) along the given datapath is not controlled by SDN controller 102. In some implementations, the first node (e.g., node 110) along a given datapath is not controlled by SDN controller 102. In such an implementation, the first controlled node along a given datapath may actually be the second node (or another downstream node) along the given datapath. In such implementations, a packet having a transmission unit size larger than the allowable MTU installed on the first controlled node may be forwarded through an uncontrolled node before reaching the first controlled node.

Figure 6:
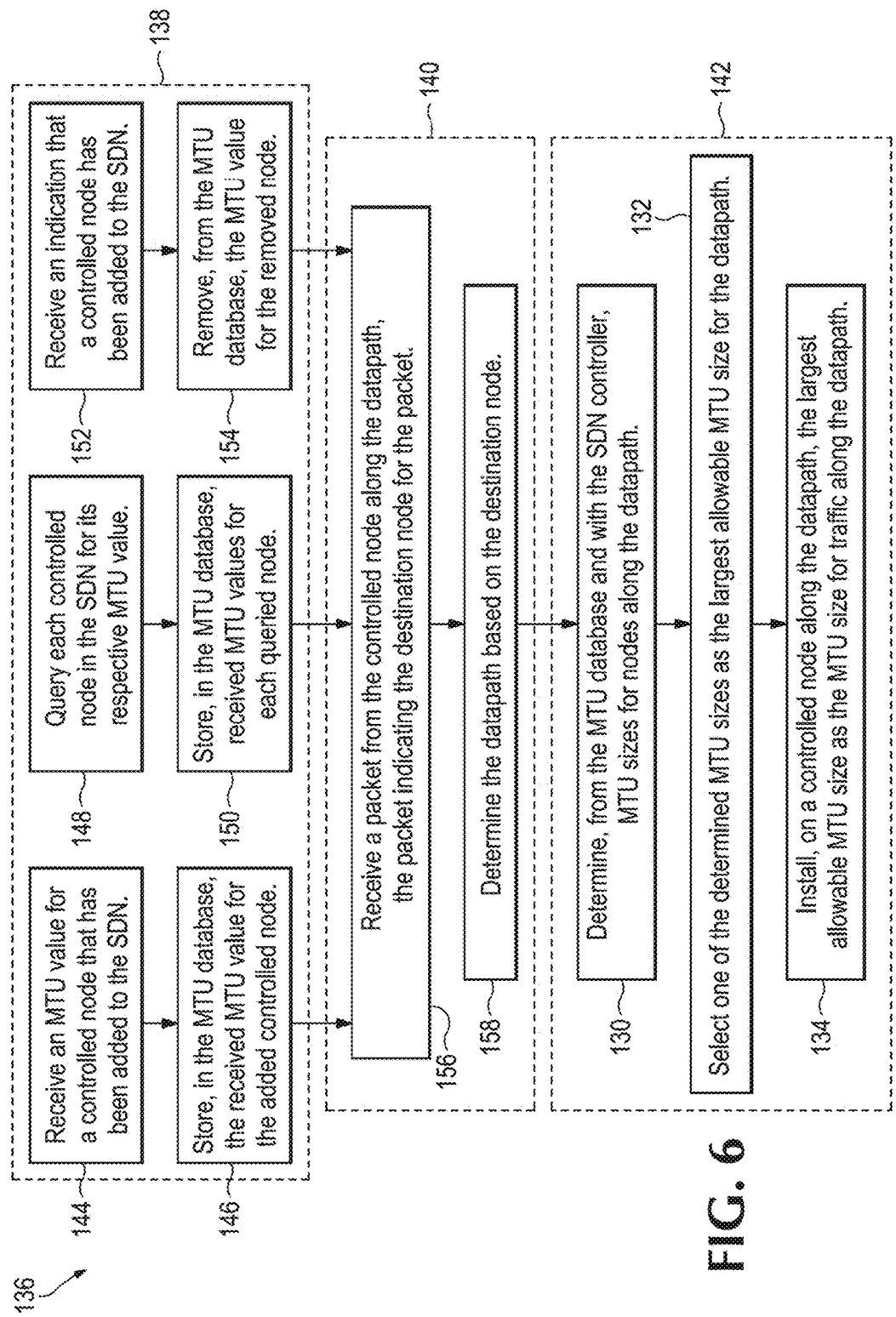
FIG. 6 is a flowchart illustrating a method, according to another example.

FIG. 6 illustrates a flowchart for another method 136 relating to the use of an SDN controller to install an allowable MTU size on a network node for traffic along a datapath. For illustration, the description of method 136 and its component steps make reference to SDN 100 and elements thereof, such as node 110, source node 106, and destination node 108, as well as other methods and steps thereof disclosed herein, such as method 128 and its component steps. However, it is appreciated that method 136 or aspects thereof can be used or otherwise applicable for any suitable network, network element, method, or step described herein or otherwise. For example, this method can, for example, be applied to computer networks with different network topologies than those illustrated in FIGS. 1-4.

As described in further detail below, method 136 can, in some implementations, be separated into three stages. In a first stage 138, the MTU database is updated based on network conditions of SDN 100. In a second stage 140, a datapath for traffic between source node 106 and destination node 108 is determined. In a third stage 142, a largest allowable MTU for the datapath is installed on network node 110 along the datapath. As described above, in first stage 138, the MTU database is updated based on network conditions of SDN 100. First stage 138 can include three paths based on network conditions of SDN 100. For example, steps 144 and 146 of first stage 138 relate to updating MTU database after a controlled node that has been added to SDN 100. In particular, step 144 includes receiving an MTU value for a controlled node that has been added to the SDN, and step 146 includes storing, in an MTU database, the received MTU value for the added controlled node.

Steps 148 and 150 of first stage 138 relate to updating the MTU database after querying controlled nodes in SDN 100. In particular, step 148 includes querying each controlled node in the SDN for its respective MTU value, and step 150 includes storing, in the MTU database, received MTU values for each queried node. Steps 152 and 154 of first stage 138 relate to updating the MTU database after a controlled node has been removed from SDN 100. In particular, step 152 includes receiving an indication that a controlled node has been removed from the SDN, and step 154 includes removing, from the MTU database, the MTU value for the removed node.

As described above, in second stage 140, a datapath for traffic between source node 106 and destination node 108 is determined. Second stage 140 can include a step 156 of receiving a packet from the first controlled node along the datapath, the packet indicating the destination node for the packet, and a step 158 of determining the datapath based on the destination node. The determination of a datapath between source node 106 and destination node 108 can be based on multiple factors. For example, the datapath may be determined based on a single criteria or weighted combination of: (1) the number of hops within a potential datapath, (2) an overall link speed over a potential datapath, and (3) congestion along a potential datapath. The term "hop count" can, for example, correspond to the number of intermediate devices (e.g., switches) through which data passes between two network nodes. The term "congestion" used in the context of networks can, for example, refer generally to situations where a link or node is carrying so much data that its quality of service deteriorates. In some situations, queuing delays, packet loss, or blocking of new connections can occur in response to such network congestion. As but one example, aspect (1) can account for 50% of the datapath selection, aspect (2) accounting for 20% of the datapath selection, and aspect (3) accounting for 30% of the datapath selection. It is appreciated that any other suitable metrics or techniques can be used to determine datapaths between a source node and a destination node.

As described above, in third stage 142, a largest allowable MTU for the datapath is installed on network node 110 along the datapath. Third stage 142 can include steps 130, 132, and 134, which are described above in detail with respect to method 128 of FIG. 5. Although the flowcharts of FIGS. 5 and 6 show a specific order of performance, it is appreciated that this order may be rearranged into another suitable order, may be executed concurrently or with partial concurrence, or a combination thereof. Likewise, suitable additional and/or comparable steps may be added to methods 128 and 136 or other methods described herein in order to achieve the same or comparable functionality. For example, the respective order of first, second, and third stages are provided for purposes of illustration of one implementation. However, these stages may be reordered in other implementations. As but one example, second stage 140 may, in some implementations, be performed before first stage 138. Moreover, in some implementations, one or more stages or steps therein are omitted. For example, in some implementations, second stage 140 is omitted from method 136.

Figure 7:
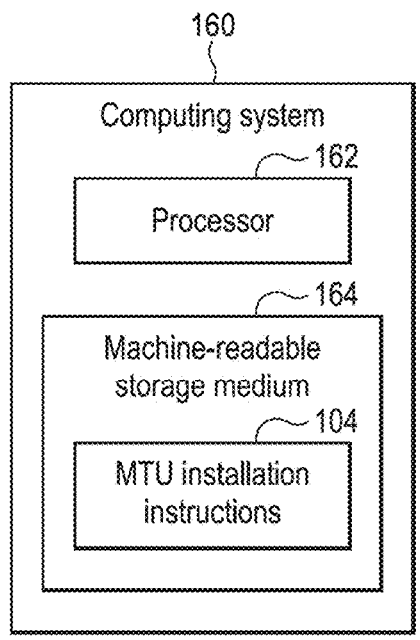
FIG. 7 is a diagram of a computing system that includes MTU installation instructions, according to an example.

FIG. 7 illustrates an example of SDN controller in the form of a computing system 160 for running MTU installation instructions 104 in accordance with the present disclosure. Computing system 160 can, for example, be used to provide switch functionality for a network by executing one or more steps of methods 128, 136, or other methods described herein. The description of computing system 160 refers to elements of SDN 100 for illustration, however, it is appreciated that computing system 160 can be used with any suitable network. Computing system 160 includes a processor 162 and machine-readable storage medium 164 as described further below. It is appreciated that computing system 160 can include additional elements, such as input/output (I/O) devices, a communication interface, etc. It is appreciated that one or hardware or software elements for SDN controller 102 described herein may be implemented in computing system 160. In some implementations, software that provides the functionality of SDN controller 102 can be stored on machine-readable storage medium 164 of computing system 160 to be executed by processor 162 of computing system 160.

Processor 162 of computing system 160 can, for example, be in the form of a central processing unit (CPU), a semiconductor-based microprocessor, a digital signal processor (DSP) such as a digital image processing unit, other hardware devices or processing elements suitable to retrieve and execute instructions stored in medium 164, or suitable combinations thereof. Processor 162 can, for example, include single or multiple cores on a chip, multiple cores across multiple chips, multiple cores across multiple devices, or suitable combinations thereof. Processor 162 can be functional to fetch, decode, and execute instructions as described herein. As an alternative or in addition to retrieving and executing instructions, processor 162 can, for example, include at least one integrated circuit (IC), other control logic, other electronic circuits, or suitable combination thereof that include a number of electronic components for performing the functionality of instructions stored on medium 164. Processor 162 can, for example, be implemented across multiple processing units and instructions may be implemented by different processing units in different areas of computing system 160.

Medium 164 of computing system 160 can, for example, be in the form of a non-transitory machine-readable storage medium, such as a suitable electronic, magnetic, optical, or other physical storage apparatus to contain or store information such as MTU installation instructions 104. MTU installation instructions 104 can be machine readable instructions executable by processor 162 such that computing system 160 is operative to perform one or more functions described herein, such as those described above with respect to methods 128, 136, or other methods described herein. In some implementations, medium 164 can store MTU value data of the MTU database.

Medium 164 can, for example, be housed within the same housing as processor 162 for computing system 160, such as within a computing tower case for computing system 160. In some implementations, medium 164 and processor 162 are housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, medium 164 can correspond to a memory including a main memory, such as a Random Access Memory (RAM), where software may reside during runtime, and a secondary memory. The secondary memory can, for example, include a nonvolatile memory where a copy of machine-readable instructions are stored. It is appreciated that instructions and data can be stored on separate machine-readable storage mediums and multiple mediums can be treated as a single medium 164 for purposes of description.

Figure 8:
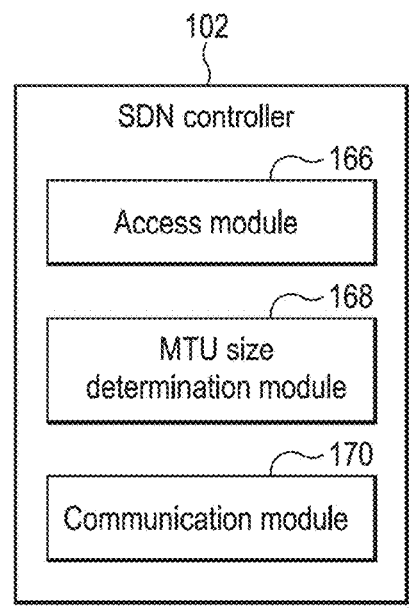
FIG. 8 is a diagram of an SDN controller that includes MTU installation instructions, according to an example.

FIG. 8 illustrates SDN controller 102 in the form of functional modules that can, for example, be operative to execute one or more steps of methods 128, 136, or other methods described herein. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or at hardware and software hosted at hardware. Additionally, as used herein, the singular forms "a," "an," and "the" include plural referents unless the context clearly dictates otherwise. Thus, for example, the term "module" is intended to mean one or more modules or a combination of modules. Each module of SDN controller 102 can include one or more machine-readable storage mediums, such as medium 164, and one or more computer processors, such as processor 162. For example, software that provides the functionality of modules on SDN controller 102 can be stored on a memory of a computer to be executed by a processor of the computer.

The implementation of SDN controller 102 of FIG. 8 includes an access module 166, an MTU size determination module 168, and a communication module 170, as described further below. It is appreciated that other modules can be added to SDN controller 102 for additional or alternative functionality. For example, another implementation of SDN controller 102 (described with respect to FIG. 9) includes additional modules, such as an MTU database storage module.

Access module 166 of SDN controller 102 includes a combination of hardware and software to allow SDN controller 102 to access a maximum transmission unit (MTU) database that includes stored MTU values for nodes along a datapath between source node 106 and destination node 108 in SDN 100. Access module 166 can, for example, include one or more machine-readable storage mediums, such as medium 164, and one or more computer processors, such as processor 162, to implement one or more aspects of step 130 (or other steps) of methods 128 and 136 described above with respect to FIGS. 5 and 6.

MTU size determination module 168 of SDN controller 102 includes a combination of hardware and software to allow SDN controller 102 to determine, based on accessed values from the MTU database, a largest allowable MTU size for a datapath. MTU size determination module 168 can, for example, include one or more machine-readable storage mediums, such as medium 164, and one or more computer processors, such as processor 162, to implement one or more aspects of step 132 (or other steps) of methods 128 and 136 described above with respect to FIGS. 5 and 6.

Communication module 170 of SDN controller 102 includes a combination of hardware and software to allow SDN controller 102 to provide the largest allowable MTU size to a first controlled node (e.g., node 110) along a datapath (e.g., the datapath depicted in FIG. 1) with instructions for the first controlled node to install the largest allowable MTU size as an MTU for traffic along the data path. Communication module 170 can, for example, include one or more machine-readable storage mediums, such as medium 164, and one or more computer processors, such as processor 162, to implement one or more aspects of step 134 (or other steps) of methods 128 and 136 described above with respect to FIGS. 5 and 6.

Figure 9:
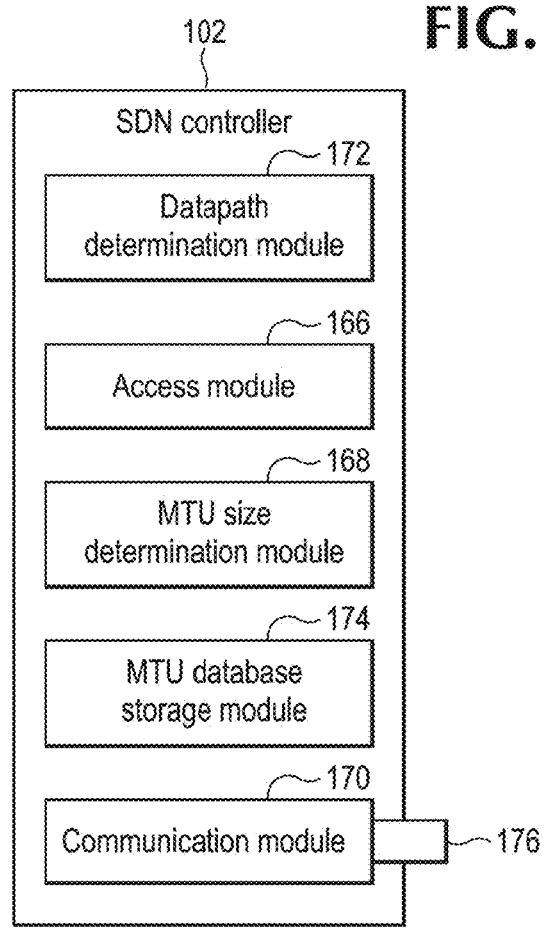
FIG. 9 is a diagram of an SDN controller that includes MTU installation instructions, according to another example.

FIG. 9 illustrates another example of an SDN controller 102 in the form of functional modules that can, for example, be operative to execute one or more steps of methods 128, 136, or other methods described herein. SDN controller 102 as depicted in FIG. 9 includes access module 166, MTU size determination module 168, and communication module 170, examples of which are described above with respect to FIG. 8. SDN controller 102 of FIG. 8 further includes additional aspects of communication module 170 as well as a datapath determination module 172 and MTU database storage module 174, as described in further detail below.

As depicted, for example, in the implementation of SDN controller 102 of FIG. 8, communication module 170 can include one or more physical data ports 176 to connect to elements of SDN 100. For example, in some implementations, communication module 170 can include a network interface controller having an Ethernet port. In some implementations, communication module 170 can include wired or wireless communication interface. Communication module 170 can, in some implementations, provide for virtual network ports. In some implementations, communication module 170 includes hardware in the form of a hard drive, related firmware, and other software for allowing the hard drive to operatively communicate with other hardware of SDN controller 102. Communication module 170 can include information for use with communication module 170, such as firmware for implementing physical or virtual network ports.

MTU database storage module 174 can include a combination of hardware and software to access data from and store data to the MTU database. For example, in some implementations, the MTU database can be stored locally on SDN controller 102 within MTU database storage module 174, whereas in other implementations, the MTU database can be stored remotely from SDN controller 102. MTU database storage module 174 can, for example, include one or more machine-readable storage mediums, such as medium 164, and one or more computer processors, such as processor 162, to implement one or more aspects of steps 146, 150, 154, and 130 (or other steps) of methods 128 and 136 described above with respect to FIGS. 5 and 6.

Datapath determination module 172 of SDN controller 102 includes a combination of hardware and software to allow SDN controller 102 to determine a datapath for traffic based on the type of traffic, network conditions, the source node and the destination node. Datapath determination module 172 can, for example, include one or more machine-readable storage mediums, such as medium 164, and one or more computer processors, such as processor 162, to implement one or more aspects of step 148 or 150 (or other steps) of method 136 described above with respect to FIG. 6. Datapath determination module 172 can include information for use with datapath determination module 172, such as rules or criteria for datapath determination based on types of traffic and network conditions.

In some implementations, SDN controller 102 can include an I/O module to allow communication to and from SDN controller 102. Example of suitable I/O modules can include modules for monitors, printers, keyboards, mouses, styluses, touchscreens, speakers, etc. I/O devices for such modules can be connected to elements of SDN controller 102 via wired or wireless links.

It is appreciated that certain modules described herein or otherwise can, in some implementations, share hardware, software, or data with other modules. For example, in some implementations, access module 166 can share a computer-readable medium (e.g., medium 164) with MTU database storage module 174, whereas in some implementations, access module 166 and MTU database storage module 174 use separate mediums. It is appreciated that any modules can share hardware, software, or data with any other module in order to achieve their respective objectives.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations.

As used herein, the term "provide" includes push mechanisms (e.g., sending data independent of a request for that data), pull mechanisms (e.g., delivering data in response to a request for that data), and store mechanisms (e.g., storing data at an intermediary at which the data can be accessed).

Furthermore, as used herein, the term "based on" means "based at least in part on." Thus, a feature that is described based on some cause, can be based only on the cause, or based on that cause and on one or more other causes.

Furthermore, it should be understood that the systems, networks, and methods described herein can include various combinations and/or sub-combinations of the components and/or features of the different implementations described. Thus, features described with reference to one or more implementations can be combined with other implementations described herein.

What is claimed is:

1. A method comprising:
   determining, from a maximum transmission unit (MTU) database and with a software-defined network (SDN) controller in an SDN, MTU sizes for switches along a datapath in the SDN, wherein the SDN controller controls a plurality of the switches along the datapath in accordance with a SDN protocol;
   selecting one of the determined MTU sizes as the largest allowable MTU size for the datapath; and
   installing, on a controlled switch along the datapath, the largest allowable MTU size as the MTU size for traffic along the datapath, which includes:
     installing, on a controlled switch along a first datapath, a first datapath's largest allowable MTU size as the MTU size for traffic along the first datapath; and
     installing, on a controlled switch along a second datapath, a second datapath's largest allowable MTU size as the MTU size for traffic along the second datapath.

2. The method of claim 1, wherein the largest allowable MTU size is installed on a first controlled switch along the datapath.

3. The method of claim 1, wherein the largest allowable MTU size is installed on a controlled switch selected to minimize the number of times a packet is to be fragmented along the datapath.

4. The method of claim 1, wherein the smallest MTU size among the determined MTU sizes is selected as the largest allowable MTU size for traffic along the datapath.

5. The method of claim 1, wherein the controlled node switch along the first datapath is the same node switch as the controlled node switch along the second datapath.

6. The method of claim 1, further comprising:
   receiving an MTU value for a controlled switch that has been added to the SDN; and
   storing, in the MTU database, the received MTU value for the added controlled switch.

7. The method of claim 1, further comprising:
   querying each controlled switch in the SDN for its respective MTU value; and
   storing, in the MTU database, received MTU values for each queried switch.

8. The method of claim 1, further comprising:
   receiving an indication that a controlled switch has been removed from the SDN; and
   removing, from the MTU database, the MTU value for the removed switch.

9. The method of claim 1, further comprising:
   receiving a packet from the controlled switch along the datapath, the packet indicating a destination node for the packet; and
   determining the datapath based on the destination node.

10. The method of claim 1, wherein at least one switch along the datapath is controlled by the SDN controller, and wherein at least one switch along the datapath is not controlled by the SDN controller.

11. A software-defined network (SDN) controller comprising:
an access module to access a maximum transmission unit (MTU) database that includes stored MTU values for switches along a datapath between a source node and a destination node in an SDN;
a MTU size determination module to determine, based on accessed values from the MTU database, a largest allowable MTU size for the datapath; and
a communication module to provide the largest allowable MTU size to a controlled switch along the datapath with instructions for the controlled switch to install the largest allowable MTU size as an MTU for traffic along the datapath,
wherein the SDN controller controls a plurality of the switches along the datapath in accordance with a SDN protocol; and
wherein installing the largest allowable MTU size includes:
installing, on a controlled switch along a first datapath, a first datapath's largest allowable MTU size as the MTU size for traffic along the first datapath; and
installing, on a controlled switch along a second datapath, a second datapath's largest allowable MTU size as the MTU size for traffic along the second datapath.

12. The SDN controller of claim 11, wherein the communication module includes a physical data port connected to another node in the SDN via a wired link to send and receive data over the link.

13. The SDN controller of claim 11, further comprising:
a datapath determination module to determine the datapath for traffic based on the type of traffic, network conditions, the source node and the destination node.

14. A non-transitory machine-readable storage medium encoded with instructions executable by a processor of a software-defined network (SDN) controller, the instructions comprising:
instructions to determine, based on maximum transmission unit (MTU) size values stored in an MTU database, MTU size values for switches along a datapath in the SDN, wherein the SDN controller controls a plurality of the switches along the datapath in accordance with a SDN protocol;
instructions to store the smallest MTU size among the determined MTU sizes as the largest allowable MTU size for the datapath; and
instructions to install, on a switch controlled by the SDN controller along the datapath, the largest allowable MTU size as the MTU size for traffic along the datapath, which includes:
installing, on a controlled switch along a first datapath, a first datapath's largest allowable MTU size as the MTU size for traffic along the first datapath; and
installing, on a controlled switch along a second datapath, a second datapath's largest allowable MTU size as the MTU size for traffic along the second datapath.

* * * * *